United States Patent
Nishita

(10) Patent No.: US 12,359,915 B2
(45) Date of Patent: Jul. 15, 2025

(54) SURVEYING INSTRUMENT AND SURVEYING SYSTEM

(71) Applicant: TOPCON Corporation, Tokyo-to (JP)

(72) Inventor: Nobuyuki Nishita, Tokyo-to (JP)

(73) Assignee: TOPCON CORPORATION, Tokyo-to (JP)

( * ) Notice: Subject to any disclaimer, the term of this patent is extended or adjusted under 35 U.S.C. 154(b) by 1144 days.

(21) Appl. No.: 17/215,074

(22) Filed: Mar. 29, 2021

(65) Prior Publication Data

US 2021/0302162 A1   Sep. 30, 2021

(30) Foreign Application Priority Data

Mar. 30, 2020 (JP) .................. 2020-060347

(51) Int. Cl.
  *G01C 15/00* (2006.01)
  *G01S 7/481* (2006.01)
  *G01S 17/89* (2020.01)
(52) U.S. Cl.
  CPC .......... *G01C 15/004* (2013.01); *G01S 7/4817* (2013.01); *G01S 17/89* (2013.01)
(58) Field of Classification Search
  CPC ... G01C 15/004; G01C 15/002; G01S 7/4817; G01S 17/89; G01S 7/4808; G01S 17/42
  See application file for complete search history.

(56) References Cited

U.S. PATENT DOCUMENTS

| | | | |
|---|---|---|---|
| 2008/0208417 A1* | 8/2008 | Buehlmann | E01C 19/48 701/50 |
| 2016/0033643 A1* | 2/2016 | Zweigle | G05D 1/024 356/5.01 |
| 2016/0238708 A1 | 8/2016 | Ohtomo et al. | |
| 2016/0259039 A1 | 9/2016 | Ohtomo et al. | |
| 2017/0131404 A1 | 5/2017 | Ohtomo et al. | |
| 2018/0284235 A1* | 10/2018 | Ohtomo | G01S 17/89 |

(Continued)

FOREIGN PATENT DOCUMENTS

| | | |
|---|---|---|
| JP | 2016-151423 A | 8/2016 |
| JP | 2016-161411 A | 9/2016 |

(Continued)

*Primary Examiner* — Luke D Ratcliffe
*Assistant Examiner* — Jempson Noel
(74) *Attorney, Agent, or Firm* — Nields, Lemack & Frame, LLC

(57) ABSTRACT

Provided is a surveying instrument including a surveying instrument main body, in which the surveying instrument main body includes a distance measuring module configured to project the distance measuring light toward an object and to perform the distance measurement, an optical axis deflector configured to at least uniaxially perform a scan using the distance measuring light, a storage module configured to store a two-dimensional map, and an arithmetic control module, and the arithmetic control module is configured to compare two-dimensional coordinates excluding a height in three-dimensional coordinates of each point acquired along a locus of the distance measuring light with the positional information of the measuring point in said two-dimensional map, and select a point which is in a range of a threshold value set in advance from the positional information of the measuring point in the two-dimensional map as the measuring point.

20 Claims, 9 Drawing Sheets

(56) References Cited

U.S. PATENT DOCUMENTS

| | | | |
|---|---|---|---|
| 2018/0329041 A1* | 11/2018 | Ohtomo | G01S 7/4817 |
| 2019/0063920 A1* | 2/2019 | Nishita | G01S 7/4817 |
| 2019/0170861 A1 | 6/2019 | Takahashi et al. | |
| 2019/0227173 A1 | 7/2019 | Nishita | |

FOREIGN PATENT DOCUMENTS

| | | |
|---|---|---|
| JP | 2017-37016 A | 2/2017 |
| JP | 2017-90244 A | 5/2017 |
| JP | 2017-223541 A | 12/2017 |
| JP | 2018-173346 A | 11/2018 |
| JP | 2018-189576 A | 11/2018 |
| JP | 2019-100898 A | 6/2019 |
| JP | 2019-128196 A | 8/2019 |

* cited by examiner

SURVEYING INSTRUMENT AND SURVEYING SYSTEM

BACKGROUND OF THE INVENTION

The present invention relates to a surveying instrument and a surveying system which can acquire three-dimensional coordinates of an object.

In general, to make a survey, for instance, a retroreflective prism is installed as an object on a measuring point. Further, a prism is sighted by a surveying instrument such as a total station or a laser scanner installed on a known point, a distance to the prism as well as a horizontal angle and a vertical angle of a sighting direction with respect to a known direction are measured, and three-dimensional coordinates of the measuring point are measured.

In case of guiding the prism to a next measuring point (a piling point) in a layout work or the like, there is a method for referring to a direction of the next measuring point with respect to the surveying instrument displayed in an operation terminal or the like and guiding the prism to the next measuring point while tracking the prism with the use of the surveying instrument.

Further, there is also a method for providing a guide light irradiation mechanism, which can visually confirm the left and right sides with respect to the irradiating direction, in the surveying instrument. In this case, in a state where the next measuring point being visually confirmed by the surveying instrument, the prism is moved to the vicinity of the next measuring point while visually confirming the guide light by a worker, and the surveying instrument starts the tracking when the prism has moved closer to the measuring point.

Further, there is also a method for automatically identifying a position of the measuring point and irradiating the identified measuring point with the use of the visual light, for instance, the laser pointer light. However, in order to automatically identify the position of the measuring point, the point cloud data corresponding to the whole circumference of 360° must be acquired, and hence the acquisition of the point cloud data takes time. Further, since the number of data to be acquired becomes huge, a calculation to identify the measuring point also takes time.

SUMMARY OF INVENTION

It is an object of the present invention to provide a surveying instrument and a surveying system which can be shortened in data acquisition time and calculation time.

To attain the object as described above, a surveying instrument according to the present invention includes a surveying instrument main body, wherein the surveying instrument main body includes a distance measuring module configured to project the distance measuring light toward an object and to perform the distance measurement based on the reflected distance measuring light from the object, an optical axis deflector configured to at least uniaxially perform a scan using the distance measuring light, a storage module configured to store a two-dimensional map having the positional information of a plurality of measuring points, and an arithmetic control module configured to control operations of the distance measuring module and the optical axis deflector, and the arithmetic control module is configured to compare two-dimensional coordinates excluding a height in three-dimensional coordinates of each point acquired along a locus of the distance measuring light with the positional information of the measuring point in the two-dimensional map, and select a point which is in a range of a threshold value set in advance from the positional information of the measuring point in the two-dimensional map as the measuring point.

Further, in the surveying instrument according to a preferred embodiment, the arithmetic control module is configured to calculate a rotation angle from a predetermined measuring point to a next measuring point based on the two-dimensional map, and rotate the surveying instrument main body based on the rotation angle.

Further, in the surveying instrument according to a preferred embodiment, a guiding light irradiation module configured to irradiate the guiding light, wherein the arithmetic control module is configured to indicate the selected measuring point with the guiding light.

Further, in the surveying instrument according to a preferred embodiment, the guiding light irradiation module is the distance measuring module, and the guiding light is the distance measuring light which is the visible light.

Further, in the surveying instrument according to a preferred embodiment, the guiding light irradiation module is configured to irradiate the laser pointer light coaxially with the distance measuring light.

Further, in the surveying instrument according to a preferred embodiment, the guiding light irradiation module is configured to irradiate the laser pointer light with a known offset amount with respect to an optical axis of the distance measuring light, and to rotate integrally with the surveying instrument main body by a rotation driving module which rotates the surveying instrument main body in a left-and-right direction or an up-and-down direction.

Further, in the surveying instrument according to a preferred embodiment, the optical axis deflector is a pair of optical prisms rotatable around the optical axis of the distance measuring light and is configured to control an irradiating direction of the distance measuring light by controlling rotating directions, rotation speeds and a rotation ratio of the pair of optical prisms, and the arithmetic control module is configured to control the optical axis deflector in such a manner that the distance measuring light draws a circle with a predetermined radius around the selected measuring point.

Further, in the surveying instrument according to a preferred embodiment, a rotation driving module configured to rotate the surveying instrument main body in a left-and-right direction or an up-and-down direction, wherein the optical axis deflector is a scanning mirror (84) which is uniaxially rotatable around an optical axis of the distance measuring light, and the arithmetic control module is configured to control the rotation driving module and the scanning mirror in such a manner that the selected measuring point is irradiated with the distance measuring light.

Further, in the surveying instrument according to a preferred embodiment, the arithmetic control module is configured to select two points closest from the measuring point in the two-dimensional map among respective points acquired along the locus of the distance measuring light and to calculate a point closest from the measuring point in the two-dimensional map on a line connecting the selected two points as the measuring point.

Further, in the surveying instrument according to a preferred embodiment, the arithmetic control module is configured to give notice with the use of an alarm in a case where respective points acquired along the locus of the distance measuring light are not present in the range of the threshold value.

Further, in the surveying instrument according to a preferred embodiment, the arithmetic control module is configured to control the optical axis deflector in such a manner that a scan using the distance measuring light is performed in a direction vertical with respect to a plane of the two-dimensional map.

Further, a surveying system according to the present invention includes a target instrument installed on a predetermined measuring point and a surveying instrument configured to track the target instrument, wherein the surveying instrument includes a distance measuring module configured to project the distance measuring light toward the target instrument and to perform the distance measurement based on the reflected distance measuring light from the target instrument, an optical axis deflector configured to at least uniaxially perform a scan using the distance measuring light, a storage module configured to store a two-dimensional map having the positional information of a plurality of measuring points, and an arithmetic control module configured to control operations of the distance measuring module and the optical axis deflector, and the arithmetic control module is configured to calculate a rotation angle to a next measuring point based on a measurement result of the target instrument and the positional information of the measuring point in the two-dimensional map, to rotate the surveying instrument based on the rotation angle, uniaxially perform a scan along a measuring plane in such a manner that the distance measuring light passes through the next measuring point, to compare two-dimensional coordinates excluding a height in three-dimensional coordinates of each point acquired along a locus of the distance measuring light with the positional information of the measuring point in the two-dimensional map, and to select a point which is in a range of a threshold value set in advance from the positional information of the measuring point in the two-dimensional map as the measuring point.

Furthermore, in the surveying system according to a preferred embodiment, the surveying instrument further includes a guiding light irradiation module configured to irradiate the guiding light, and the arithmetic control module is configured to indicate the selected measuring point with the guiding light and move the target instrument in such a manner that the indicated measuring point coincides with a lower end of the target instrument.

According to the present invention, provided is a surveying instrument including a surveying instrument main body, wherein the surveying instrument main body includes a distance measuring module configured to project the distance measuring light toward an object and to perform the distance measurement based on the reflected distance measuring light from the object, an optical axis deflector configured to at least uniaxially perform a scan using the distance measuring light, a storage module configured to store a two-dimensional map having the positional information of a plurality of measuring points, and an arithmetic control module configured to control operations of the distance measuring module and the optical axis deflector, and the arithmetic control module is configured to compare two-dimensional coordinates excluding a height in three-dimensional coordinates of each point acquired along a locus of the distance measuring light with the positional information of the measuring point in the two-dimensional map, and select a point which is in a range of a threshold value set in advance from the positional information of the measuring point in the two-dimensional map as the measuring point. As a result, there is no need to scan the 360° whole circumference for selecting the measuring point, a reduction in point cloud data acquisition time as well as a reduction in data amount to be acquired can be can be achieved, and a calculation time can be shortened.

Further, according to the present invention, provided is a surveying system including a target instrument installed on a predetermined measuring point and a surveying instrument configured to track the target instrument, wherein the surveying instrument includes a distance measuring module configured to project the distance measuring light toward the target instrument and to perform the distance measurement based on the reflected distance measuring light from the target instrument, an optical axis deflector configured to at least uniaxially perform a scan using the distance measuring light, a storage module configured to store a two-dimensional map having the positional information of a plurality of measuring points, and an arithmetic control module configured to control operations of the distance measuring module and the optical axis deflector, and the arithmetic control module is configured to calculate a rotation angle to a next measuring point based on a measurement result of the target instrument and the positional information of the measuring point in the two-dimensional map, to rotate the surveying instrument based on the rotation angle, uniaxially perform a scan along a measuring plane in such a manner that the distance measuring light passes through the next measuring point, to compare two-dimensional coordinates excluding a height in three-dimensional coordinates of each point acquired along a locus of the distance measuring light with the positional information of the measuring point in the two-dimensional map, and to select a point which is in a range of a threshold value set in advance from the positional information of the measuring point in the two-dimensional map as the measuring point. As a result, there is no need to scan the 360° whole circumference for selecting the measuring point, a reduction in point cloud data acquisition time as well as a reduction in data amount to be acquired can be can be achieved, and a calculation time can be shortened.

DETAILED DESCRIPTION OF THE PREFERRED EMBODIMENTS

A description will be given below on the embodiments of the present invention by referring to the attached drawings.

First, by referring to FIG. 1, a description will be given on a surveying instrument according to a first embodiment of the present invention.

Figure 1:
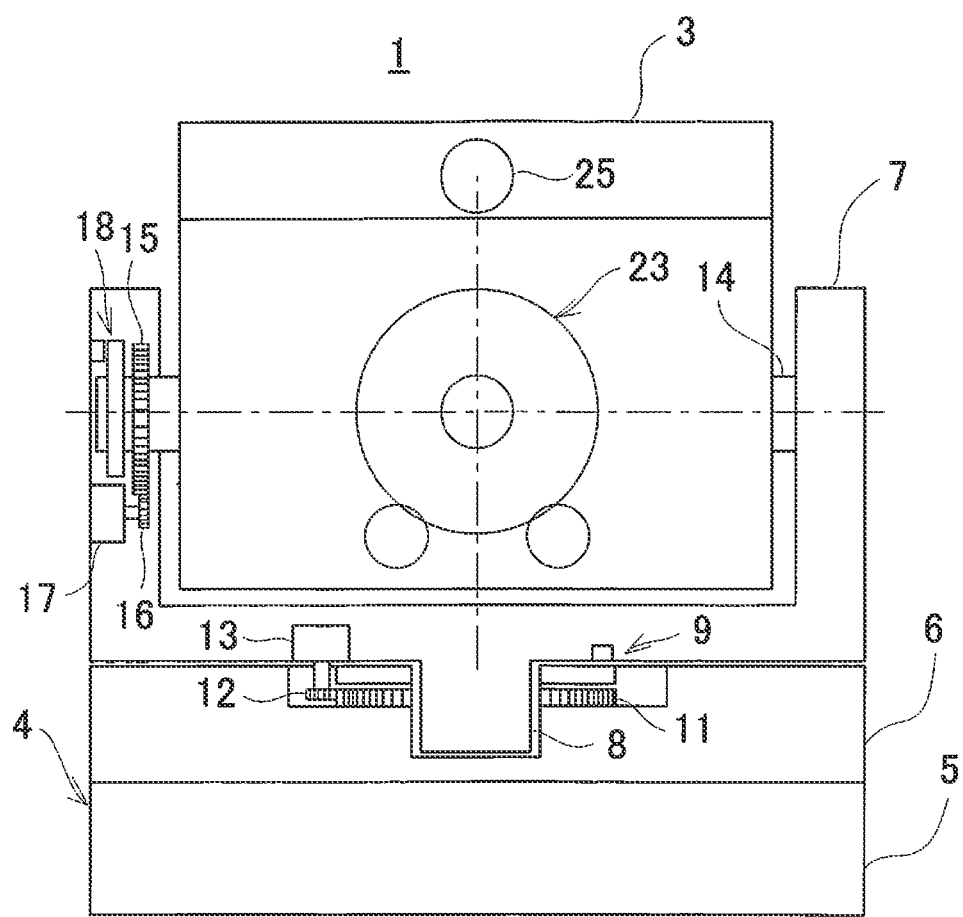
FIG. 1 is a front view to show a surveying instrument according to a first embodiment of the present invention.

In FIG. 1, a reference numeral 1 denotes a surveying instrument. The surveying instrument 1 is mainly constituted of a tripod 2 (to be described later) as a supporting device, a surveying instrument main body 3 and an installation base unit 4 as a supporting unit. The installation base unit 4 is mounted at an upper end of the tripod 2. The surveying instrument main body 3 is supported by the installation base unit 4 so that the surveying instrument main body 3 can rotate in an up-and-down direction and a left-and-right direction.

As shown in FIG. 1, the installation base unit 4 has a frame unit 5 and a base unit 6. A left-and-right rotation shaft 7 is provided to protrude from a lower surface of the frame unit 5, and the left-and-right rotation shaft 7 is rotatably fitted in the base unit 6 via a bearing (not shown). The frame unit 5 is rotatable around the left-and-right rotation shaft 7 in the left-and-right direction.

Further, a left-and-right rotation angle detector 8 (for instance, an encoder) which detects a left-and-right rotation angle (an angle in a rotating direction around the left-and-right rotation shaft 7) is provided between the left-and-right rotation shaft 7 and the base unit 6. A relative rotation angle in the left-and-right direction of the frame unit 5 with respect to the base unit 6 is detected by the left-and-right rotation angle detector 8.

A left-and-right rotation gear 9 is fixed to the base unit 6 concentrically with the left-and-right rotation shaft 7, and a left-and-right pinion gear 11 meshes with the left-and-right rotation gear 9, A left-and-right motor 12 is provided in the frame unit 5, and the left-and-right pinion gear 11 is fixed to an output shaft of the left-and-right motor 12.

The left-and-right pinion gear 11 rotates by the driving of the left-and-right motor 12, and the left-and-right pinion gear 11 revolves around the left-and-right rotation gear 9. Further, the frame unit 5 and the surveying instrument main body 3 integrally rotate. That is, the surveying instrument main body 3 is rotated in the left-and-right direction by the left-and-right motor 12.

The frame unit 5 has a recess shape having a recess portion, and the surveying instrument main body 3 is accommodated in the recess portion. The surveying instrument main body 3 is supported by the frame unit 5 via an up-and-down rotation shaft 13, and the surveying instrument main body 3 is rotatable around the up-and-down rotation shaft 13 in the up-and-down direction.

An up-and-down rotation gear 14 is fitted and fixed to one end of the up-and-down rotation shaft 13. An up-and-down pinion gear 15 meshes with the up-and-down rotation gear 14. The up-and-down pinion gear 15 is fixed to an output shaft of an up-and-down motor 16 provided on the frame unit 5. When the up-and-down motor 16 is driven, the up-and-down pinion gear 15 is rotated, further, the surveying instrument main body 3 is rotated via the up-and-down rotation gear 14 and the up-and-down rotation shaft 13. That is, the surveying instrument main body 3 is rotated in the up-and-down direction by the up-and-down motor 16.

Further, an up-and-down rotation angle detector 17 (for instance, an encoder) which detects an up-and-down rotation angle (an angle in a rotating direction around the up-and-down rotation shaft 13) is provided on one end of the up-and-down rotation shaft 13. A relative rotation angle of the surveying instrument main body 3 in the up-and-down direction with respect to the frame unit 5 is detected by the up-and-down angle detector 17.

By the cooperation between the left-and-right motor 12 and the up-and-down motor 16, the surveying instrument main body 3 can be directed toward a desired direction. It is to be noted that the frame unit 5 and the base unit 6 make up a supporting portion of the surveying instrument main body 3. Further, the left-and-right motor 12 and the up-and-down motor 16 make up a rotation driving module of the surveying instrument main body 3. Further, the left-and-right rotation angle detector 8 and the up-and-down rotation angle detector 17 make up an angle detector which detects a left-and-right rotation angle and an up-and-down rotation angle of the surveying instrument main body 3.

The driving of the left-and-right motor 12 and the up-and-down motor 16 is controlled by an arithmetic control module (to be described later) of the surveying instrument main body 3. The left-and-right rotation angle and the up-and-down rotation angle detected by the left-and-right rotation angle detector 8 and the up-and-down rotation angle detector 17 are inputted to the arithmetic control module. The data acquired by the surveying instrument main body 3, that is, the data of the left-and-right rotation angle and the up-and-down rotation angle, the distance measurement data (to be described later) and the like are stored in a storage module (to be described later). Further, various types of data acquired by the surveying instrument main body 3 are transmitted to a terminal device, a PC or the like.

It is to be noted that, in a case where a measurement area by the surveying instrument 1 is within a range of a deflection angle by an optical axis deflector (to be described later), or in a case where a direction initial settings of a reference optical axis "O" of the optical axis deflector is performed manually, the left-and-right motor 12, the left-and-right rotation angle detector 8, the up-and-down motor 16, the up-and-down rotation angle detector 17, and the like can be omitted.

Figure 2:
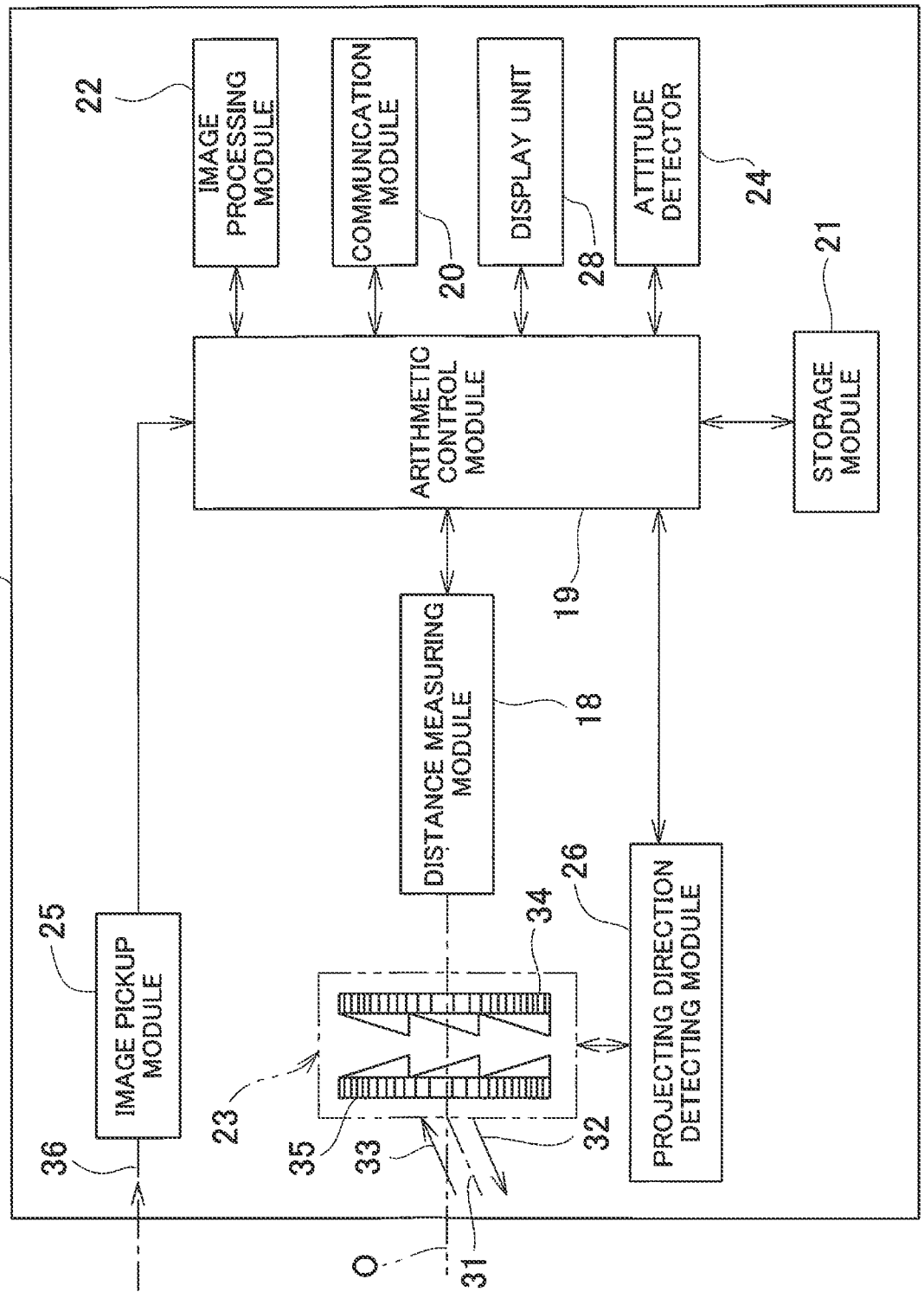
FIG. 2 is a schematical block diagram to show the surveying instrument according to the first embodiment of the present invention.

By referring to FIG. 2, a description will be given on an outline configuration of the surveying instrument main body 3.

The surveying instrument main body 3 includes a distance measuring module 18, an arithmetic control module 19, a communication module 20, a storage module 21, an image processing module 22, an optical axis deflector 23, an attitude detector 24, an image pickup module 25, a projecting direction detecting module 26 and a display unit 28, and these components are accommodated and integrated in a casing 29.

The distance measuring module 18 and the optical axis deflector 23 are arranged on the reference optical axis "O" 0. The distance measuring module 18 has a distance measuring optical axis 31 passing through the center of the optical axis deflector 23. The distance measuring module 18 emits a laser beam which is the visible light as the distance measuring light 32 onto the distance measuring optical axis 31, receives the reflected distance measuring light 33 which enters from the distance measuring optical axis 31, and performs the distance measurement of an object based on the reflected distance measuring light 33. It is to be noted that the distance measuring module 18 functions as an electronic distance meter. Further, the distance measuring module 18 also functions as a guiding light irradiation module which irradiates the distance measuring light 32 as the guiding light.

The communication module 20 has a function which enables the communication between an external device such as a PC, a portable device such as a smartphone or a tablet, and the surveying instrument main body 3.

The optical axis deflector 23 deflects the distance measuring optical axis 31, and sights on an object by the distance measuring light 32. In a state where the optical axis deflector 23 does not deflect the distance measuring optical axis 31, the distance measuring optical axis 31 coincides with the reference optical axis "O". It is to be noted that, as the optical axis deflector 23, an optical axis deflector disclosed in Japanese Patent Application Publication No. 2017-90244 can be used.

As the laser beam, any one of the continuous light or the pulsed light or an intermittent modulated distance measuring light (a burst light) disclosed in Japanese Patent Application Publication No. 2016-161411 may be used. It is to be noted that the pulsed light and the intermittent modulated distance measuring light are generically referred to as the pulsed light.

In the storage module 21, various types of programs are stored. These programs include: an image pickup control program, a display program, a tilt calculation program for calculating a tilt angle and a tilt direction of the surveying instrument main body 3 based on a detection result from the attitude detector 24, a measurement program for performing the distance measurement and the angle measurement, a deflection control program for controlling a deflecting direction of the optical axis deflector 23, a guiding program for sequentially guiding the object such as a prism to a plurality of measuring points (piling points), an image processing program for correcting a tilted image to a vertical image, a tracking program for tracking the object, a calculation program for performing various types of calculations and other programs. Further, in the storage module 21, various types of data are stored. These data include: the distance measurement data, the angle measurement data, the image data and other data. Further, in the storage module 21, a two-dimensional map which is a horizontal plan view having the positional information of the measuring points (to be described later) for piling is stored in advance. It is to be noted that the positional information in the two-dimensional map is two-dimensional plane coordinates having no height information, but the positional information may be the three-dimensional coordinate data.

The arithmetic control module 19 develops and executes the various types of programs according to an operating state of the surveying instrument main body 3, performs the control of the distance measuring module 18, the control of the optical axis deflector 23, the control of the image pickup module 25 and the like by the surveying instrument main body 3, and carries out the measurement. It is to be noted that, as the arithmetic control module 19, a CPU specialized for this instrument, a general-purpose CPU or the like is used.

Further, as the storage module 21, various types of storing means, for instance, an HDD as a magnetic storage device, and a built-in memory, a memory card, a USB memory and the like as a semiconductor storage device are used. The storage module 21 may be attachable to or removable from the casing 29. Alternatively, the storage module 21 may be configured to enable transmitting data to an external storage device or an external data processing device via a desired communicating means.

A description will be given on the optical axis deflector 23. The optical axis deflector 23 includes a pair of optical prisms 34, 35. The optical prisms 34, 35 have disk shape with the same diameter, respectively, are arranged concentrically on the distance measuring optical axis 31 while crossing the distance measuring optical axis 31 at a right angle and are arranged in parallel at a predetermined interval. When the arithmetic control module 19 controls the relative rotation of the optical prisms 34, 35 and the integral rotation of the optical prisms 34, 35, the distance measuring optical axis 31 can be deflected at an arbitrary angle from 0° to a maximum deflection angle with reference to the reference optical axis "O".

Further, when the optical prisms 34, 35 are continuously driven and the distance measuring optical axis is continuously deflected while continuously irradiating the distance measuring light 32. Thereby, the distance measuring light 32 can be scanned by a two-dimensional in a predetermined locus with the reference optical axis "O" as a center.

The predetermined locus includes a flower petal shape (a hypotrochoid curve), a linear shape, a circular shape and the like. The individual control of the optical prisms 34, 35 enables a scan in an arbitrary shape.

Next, a description will be given on the attitude detector 24. The attitude detector 24 detects a tilt of the casing 29 (that is, the surveying instrument main body 3) with respect to the horizontality in real time. As the attitude detector 24, a tilt sensor or an acceleration sensor is used, or an attitude detector disclosed in Japanese Patent Application Publication No. 2016-151423 can be used, A detection result of the attitude detector 24 is input to the calculation control module 19 and stored in the storage module 21.

The projecting direction detecting module 26 detects the relative rotation angles of the optical prisms 34, 35 and an integral rotation angle of the optical prisms 34, 35, and detects a deflecting direction (a projecting direction) of the distance measuring optical axis 31 in accordance with each pulsed light in real time.

A projecting direction detection result (an angle measurement result) is associated with a distance measurement result, and input to the arithmetic control module 19. The arithmetic control module 19 calculates three-dimensional coordinates of the object with reference to an installing position of the surveying instrument main body 3 based on the distance measurement result and the projecting direction detection result, and stores the three-dimensional coordinates in the storage module 21. It is to be noted that, when the distance measuring light 32 is burst-emitted, the distance measurement and the angle measurement are performed in accordance with each intermittent distance measuring light.

The image pickup module 25 has an image pickup optical axis 36. The image pickup module 25 is a camera having an field angle substantially equal to a maximum deflection angle θ/2 (for instance, ±30°) provided by the optical prisms 34, 35, for instance, 50° to 60°. The image pickup optical axis 36, the distance measuring optical axis 31, and the reference optical axis "O" have a known positional relationship, and a distance between the respective optical axes likewise has a known value.

Further, the image pickup module 25 can acquire still images, continuous images or video images in real time. Each image acquired by the image pickup module 25 is transmitted to the display unit 28. The center of an acquired image coincides with the image pickup optical axis 36, and the reference optical axis "O" is present at a position deviating from the center of the image at a predetermined angle based on the known relationship with the image pickup optical axis 36.

The arithmetic control module 19 controls the image pickup of the image pickup module 25. In a case where the image pickup module 25 acquires the video image or the continuous image, the arithmetic control module 19 synchronizes a timing to acquire the video image or the frame image constituting the continuous image with a timing to perform a scan using the surveying instrument main body 3. That is, the arithmetic control module 19 also associates an image with the measurement data (the distance measurement data, angle measurement data).

An image pickup element (not shown) of the image pickup module 25 is a CCD or a CMOS sensor which is an aggregation of pixels, and each pixel can specify a position on an image element. For instance, each pixel has pixel coordinates in a coordinate system with the image pickup element 36 as an origin, and a position on the image element can be specified by the pixel coordinates. Further, since the relationship (a distance) between the image pickup optical axis 36 and the reference optical axis "O" is known, a measuring position measured by the distance measuring module 18 can be associated with a position (a pixel) on the image pickup element. An image signal received from the image pickup element and the coordinate information associated with the pixel is input to the image processing module 22 via the arithmetic control module 19.

Figure 3:
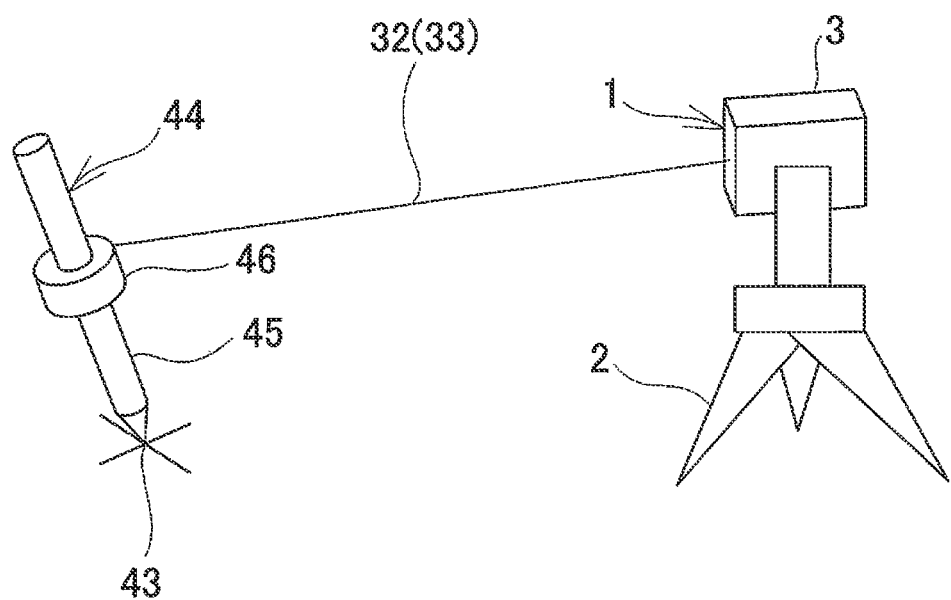
FIG. 3 is an explanatory drawing to explain the measurement of a target device by the surveying instrument.

Next, by referring to FIG. 3, a description will be given on a measuring operation of the surveying instrument 1 according to the present embodiment. The following measuring operation is carried out by the arithmetic control module 19 which executes the programs stored in the storage module 21.

The surveying instrument 1 having the surveying instrument main body 3 provided on the tripod 2 is installed on a reference point having known coordinates. In this time, since a tilt of the surveying instrument main body 3 with respect to the horizontality can be detected by the attitude detector 24, the surveying instrument main body 3 does not need to be leveled up.

Further, as the object, a target instrument 44 is installed on a predetermined measuring point (a piling point) 43. The target instrument 44 has a pole 45 having a circular cross section and a lower end which is sharp edge, and a discoid reference reflecting portion 46 provided at the intermediate portion of the pole 45, having a larger diameter than that of the pole 45. A reflective sheet having a retroreflective ability is wound around the whole circumference of the pole 45 and the reference reflecting portion 46. The reference reflecting portion 46 is provided at a known position from the lower end of the pole 45. The center of the reference reflecting portion 46 is a center point, and a distance of the center point from the lower end of the pole 45 is known.

At the time of performing the measurement of the measuring point 43, the surveying instrument main body 3 is directed toward the target instrument 44, and a search scan is performed with respect to the reference reflecting portion 46. The distance measuring light 32 is projected from the distance measuring module 18, the rotation of the optical axis deflector 23 is controlled, and the search scan is performed with respect to the vicinity of the reference reflecting portion 46 based on an acquired direction (a horizontal angle, vertical angle) of the reference reflecting portion 46. In this time, as a shape of the search scan, for instance, the two-dimensional closed loop scan pattern with a shape of numeral 8 is used.

When the search scan is performed, the arithmetic control module 19 calculates a tilt of the pole 45 and three-dimensional coordinates of the center point based on a measurement result of the pole 45 and a measurement result of the reference reflecting portion 46. Further, the arithmetic control module 19 calculates three-dimensional coordinates of the measuring point 43 based on the three-dimensional coordinates of the reference point, the tilt of the pole 45 and the distance from the lower end of the pole 45 to the center point.

Further, when the arithmetic control module 19 controls the optical axis deflector 23 so that the center of the shape of numeral 8 coincides with the center point, the target instrument 44 can be tracked. It is to be noted that, regarding to the measurement and the tracking of the target instrument 44 based on the shape of numeral 8 scan, a method disclosed in Japanese Patent Application Publication No. 2018-189576 can be used.

Next, by referring to FIG. 4A to FIG. 4F, a description will be given on a guiding operation using the surveying instrument 1. The following guiding operation is carried out by the arithmetic control module 19 which executes the programs stored in the storage module 21. It is to be noted that, in FIG. 4A to FIG. 4F, a measuring plane 47 having the plurality of measuring points 43 is the ground or a floor surface, and the measuring plane 47 is a plane having a predetermined tilt.

Figure 4A:
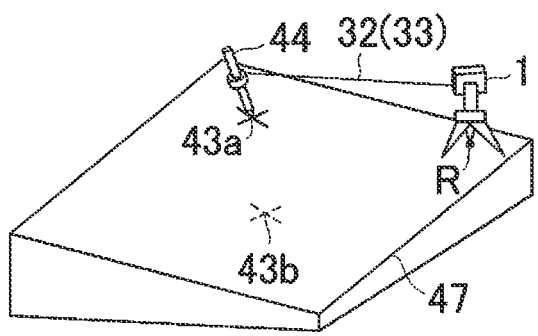
FIGS. 4A, 4B, 4C, 4D, 4E and 4F are explanatory drawings to explain the guiding processing of the target device according to a first embodiment.

As shown in FIG. 4A, the surveying instrument 1 is first installed on a reference point "R" having known three-dimensional coordinates, and the lower end of the pole 45 is arranged to coincide with a first measuring point 43a. In this state, the measurement is performed while tracking the target instrument 44 using the surveying instrument 1, and three-dimensional coordinates of the first measuring point 43a are calculated with reference to the reference point "R". Alternatively, the target instrument 44 may be installed on the reference point "R", the surveying instrument 1 may be installed at an arbitrary position, three-dimensional coordinates of the surveying instrument 1 may be calculated with reference to the reference point "R", and then the three-dimensional coordinates of the first measuring point 43a may be calculated as described above. In any case, the target instrument 44 does not have to be vertically leveled up, and the target instrument 44 may be arbitrarily tilted.

When the measurement of the first measuring point 43a is finished and the marking with respect to the first measuring point 43a is completed, the guiding the surveying instrument 1 to a next measuring point (a second measuring point 43b) is started by a portable terminal (not shown) or the like. In the storage module 21, a two-dimensional map including the positional information of the respective measuring points 43 is stored in advance. The arithmetic control module 19 calculates a left-and-right rotation angle, or an up-and-down rotation angle and the left-and-right rotation angle from the first measuring point 43a to the second measuring point 43b with the reference point R as a center based on the positional information of the first measuring point 43a and the second measuring point 43b in the two-dimensional map.

Figure 4B:
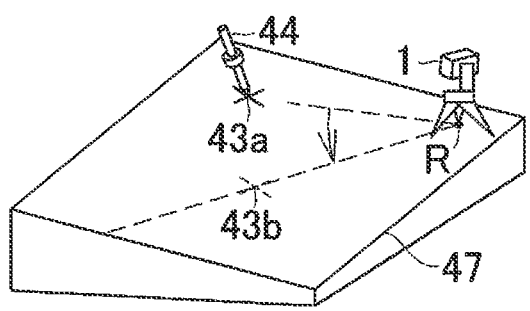
Figure 4C:
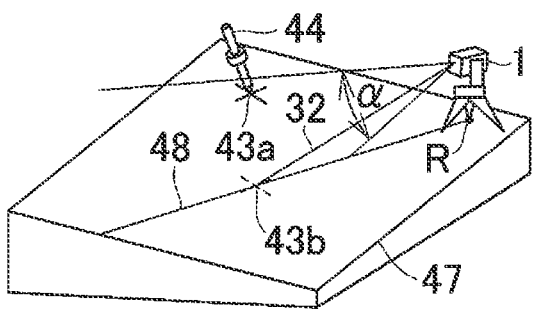

As shown in FIG. 4B, the arithmetic control module 19 drives the left-and-right motor 12 and rotates the surveying instrument main body 3 based on the calculated left-and-right rotation angle. Alternatively, the arithmetic control module 19 drives the left-and-right motor 12 and the up-and-down motor 16 and rotates the surveying instrument main body 3 based on the calculated up-and-down rotation angle and left-and-right rotation angle. After the rotation of the surveying instrument main body 3, as shown in FIG. 4C, a uniaxial scan is performed along the measuring plane 47 in such a manner that a locus 48 of the distance measuring light 32 passes through the second measuring point 43b. It is to be noted that a direction along which the uniaxial scan is performed with the distance measuring light 32 may be a direction vertical with respect to a plane of the two-dimensional map (a normal direction), that is, a perpendicular direction. It is to be noted that a scan distance of the distance measuring light 32, that is, a deflection angle "α" of the distance measuring optical axis 31 is appropriately determined in correspondence with a position or the like of the measuring plane 47.

The point cloud data is acquired along the locus 48 by the uniaxial scan, and three-dimensional coordinates are calculated in accordance with each point. The arithmetic control module 19 compares plane (two-dimensional) coordinates excluding the height information from each point of the point cloud data with plane coordinates of the second measuring point 43b in the two-dimensional map, and determines whether a matching or approximate point is present.

It is to be noted that there is a case where each point of the point cloud data is not present within a predetermined threshold value set in advance from the plane coordinates of the second measuring point 43b. In a case where, a worker is informed by an alarm or the like, a point cloud acquisition interval is changed, and the uniaxial scan is again performed with the same locus.

When there is a matched point or a most approximate point with respect to the second measuring point 43b in the two-dimensional map, the arithmetic control module 19 selects this point as the provisional second measuring point 43b. Alternatively, the arithmetic control module 19 may select at least two points closest to the second measuring point 43b in the two-dimensional map from the respective points on the locus 48, and then a point closest to the second measuring point 43b in the two-dimensional map on a straight line connecting the two points is calculated as the provisional second measuring point 43b by the arithmetic control module 19.

Figure 4D:
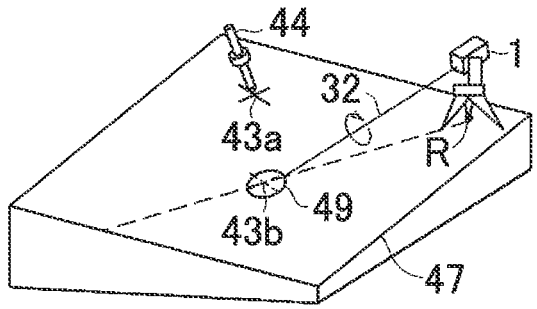

After selecting the provisional second measuring point 43b, as shown in FIG. 4D, the arithmetic control module 19 controls the optical axis deflector 23 in such a manner that the distance measuring light 32 draws a circular locus 49 having a predetermined radius with the provisional second measuring point 43b as a center on the measuring plane 47.

Figure 4E:
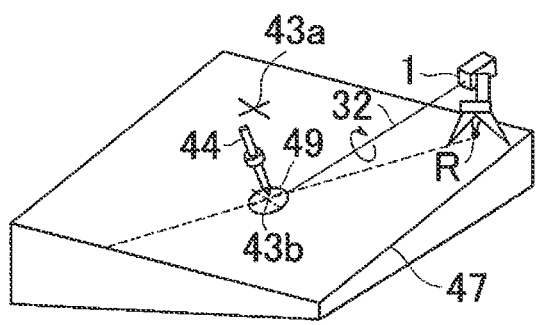

Next, as shown in FIG. 4E, the worker moves the target instrument 44 with the locus 49 as a mark, and roughly installs the target instrument 44 in such a manner that the lower end of the pole 45 coincides with the center of the locus 49 (the provisional second measuring point 43b) (the rough guiding).

After the rough installation, the worker allows the surveying instrument 1 to start the tracking of the target instrument 44 via the portable terminal. Alternatively, when the surveying instrument 1 has detected the target instrument 44, the tracking may be automatically started. The arithmetic control module 19 calculates a difference between the lower end of the pole 45 and the second measuring point 43b in the two-dimensional map based on measurement results of the pole 45 and the reference reflecting portion 46 in real time, and transmits a calculation result to the portable terminal via the communication module 20.

Figure 4F:
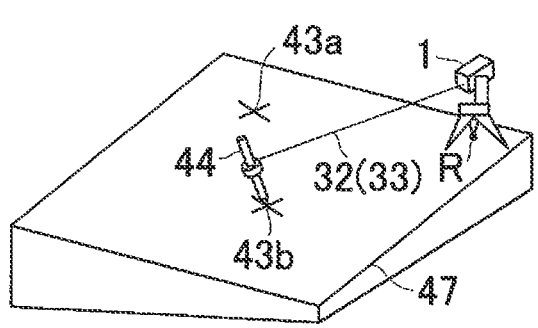

As shown in FIG. 4F, the worker installs the target instrument 44 based on the calculation result (the guiding information) displayed in the portable terminal in such a manner that the lower end of the pole 45 coincides with the second measuring point 43b (the accurate guiding).

At last, by marking the second measuring point 43b, the distance measuring instrument 1 completes the guiding processing from the first measuring point 43a to the second measuring point 43b. The processing is also performed with respect to the third and subsequent measuring points in the same manner as the guiding processing.

As described above, the first embodiment is configured so that a position of the next measuring point 43 is indicated by the distance measuring light 32 which is the visible light based on the two-dimensional map stored in advance in the storage module 21.

Therefore, since the worker can visually confirm the next measuring point 43 and easily move the target instrument 44 to the vicinity of the measuring point 43, the work efficiency can be improved.

Further, in the first embodiment, the uniaxial scan is performed in the normal direction of the two-dimensional map, and a rough position of the measuring point 43 is determined based on the acquired point cloud data. Therefore, since the 360° whole circumference does not have to be scanned, a point cloud data acquisition time can be shortened. Further, a data amount required for determining the rough position of the measuring point 43 is reduced, and a calculation time can be shortened.

Further, since the data amount for determining the rough position is reduced, it is possible to easily cope even in a case where a scanning direction has changed by, for instance, changing a position or a direction of the surveying instrument 1.

Further, the surveying instrument 1 tracks the target instrument 44 after performing the rough guiding of the target instrument 44. Therefore, since a tracking distance becomes small, the interruption of the tracking due to an obstacle or the like can be suppressed.

Further, the two-dimensional map is a horizontal two-dimensional plan having no height information. Therefore, even if the measuring plane 47 has the irregularities, a position of the measuring point 43 in a real space can be directly indicated without being affected by the irregularities.

It is to be noted that, in the first embodiment, a pair of optical prisms 34, 35 are used as the optical axis deflector 23. On the other hand, as the optical axis deflector 23, a galvanometer mirror which is a combination of one mirror rotatable around a predetermined rotation axis and the other mirror rotatable around a rotation axis orthogonal with respect to the rotation axis of the mirror may be used.

Further, in the first embodiment, the distance measuring light 32 is the visible light and the distance measuring module 18 is configured to also serve as a guiding light irradiation module, but the distance measuring module 18 and the guiding light irradiation module may be independently configured, respectively. For instance, the guiding light irradiation module which irradiates the laser pointer light coaxially with the distance measuring light 32 may be additionally provided in the surveying instrument main body 3. In this case, in a rough guiding step and an accurate guiding step, the irradiation of the laser pointer light can be performed, and the target instrument 44 can be guided by the laser pointer light.

Figure 5:
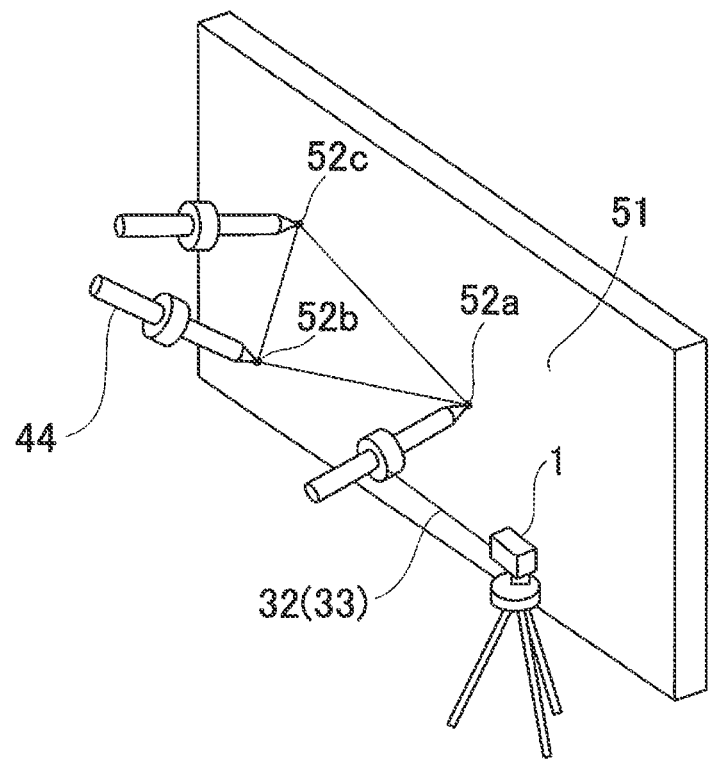
FIG. 5 is an explanatory drawing to explain a case where a measuring plane is a wall surface in the first embodiment.
Figure 6:
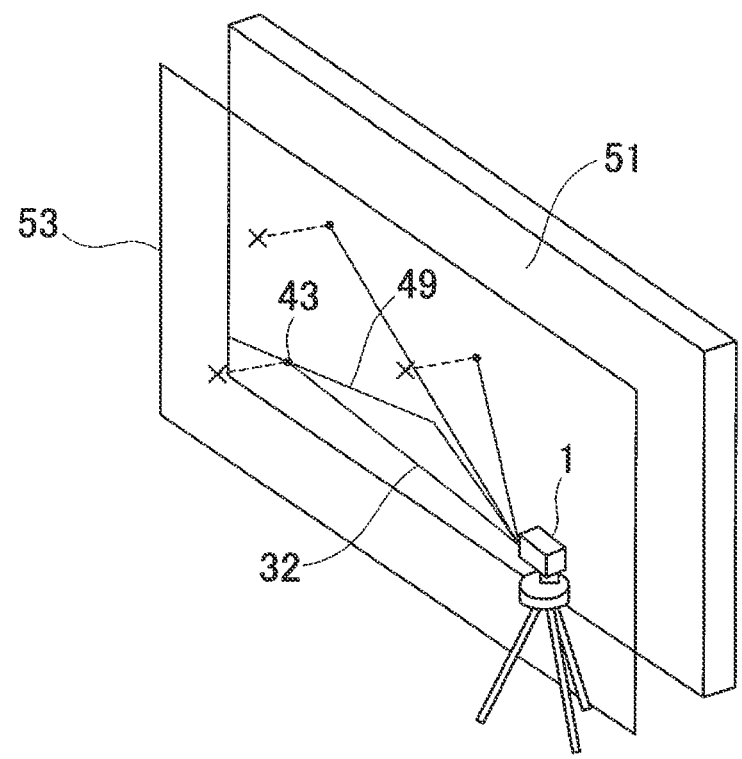
FIG. 6 is an explanatory drawing to explain a relationship between the wall surface and a two-dimensional map.

Further, the guiding light irradiation module may be externally provided to the surveying instrument main body 3. In this case, the guiding light irradiation module is provided to the surveying instrument main body 3 so that an offset amount of an optical axis of the laser pointer light with respect to the distance measuring optical axis 31 is known. Further, in the rough guiding step and the accurate guiding step, when the guiding light irradiation module is rotated integrally with the surveying instrument main body 3 by the cooperation between the left-and-right motor 12 and the up-and-down motor 16, the target instrument 44 can be guided by the laser pointer light. It is to be noted that, in a case where the distance measuring module 18 and the guiding light irradiation module are provided independently, the distance measuring light 32 can be the invisible light. It is to be noted that, in the first embodiment, the ground or a floor surface is used as the measuring plane 47, and the guiding processing is performed, but the measuring plane 47 may be, for instance, a wall surface or a ceiling surface. FIG. 5 and FIG. 6 show the guiding processing when a flat wall surface is the measuring plane 51.

When the wall surface is the measuring plane 51, likewise, the surveying instrument 1 is installed on the ground or the floor surface. In this case, a tilt angle and a tilt direction of the measuring plane 51 are unknown. Therefore, as shown in FIG. 6, the calculation control module 19 first measures at least arbitrary three points 52a, 52b and 52c on the measuring plane 51, and calculates the tilt angle and the tilt direction of the measuring plane 51 based on a measurement result of the three points 52a, 52b and 52c.

After calculating the tilt angle and the tilt direction of the measuring plane 51, the guiding processing is performed by the same processing as that in the case where the ground or the floor surface is the measuring plane. That is, the arithmetic control module 19 rotates the surveying instrument main body 3 based on any one of a left-and-right rotation angle and an up-and-down rotation angle, or the left-and-right rotation angle and the up-and-down rotation angle to a next measuring point 43 calculated from a two-dimensional map 53, and performs a uniaxial scan along the measuring plane 51 so that a locus 48 of the distance measuring light 32 passes through the next measuring point 43. In this time, a scan direction is a direction vertical with respect to the two-dimensional map 53 overlapping the measuring plane 51 (a normal direction). Further, the calculation control module 19 selects a point closest to the next measuring point 43 in the two-dimensional map 53 as a provisional measuring point, and the rough guiding is performed based on the locus 49 having the provisional measuring point as a center.

Figure 7:
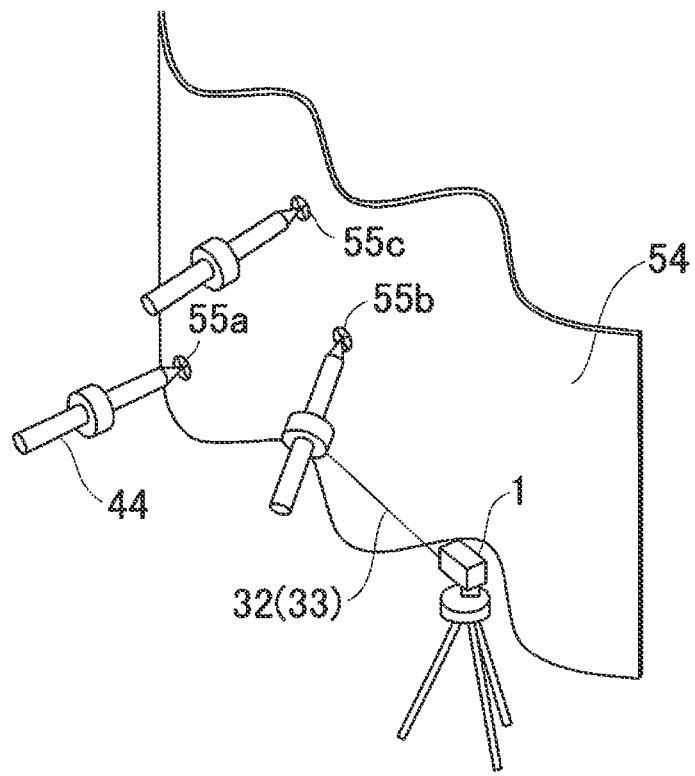
FIG. 7 is an explanatory drawing to explain a case where a measuring plane is a wall surface having irregularities in the first embodiment.
Figure 8:
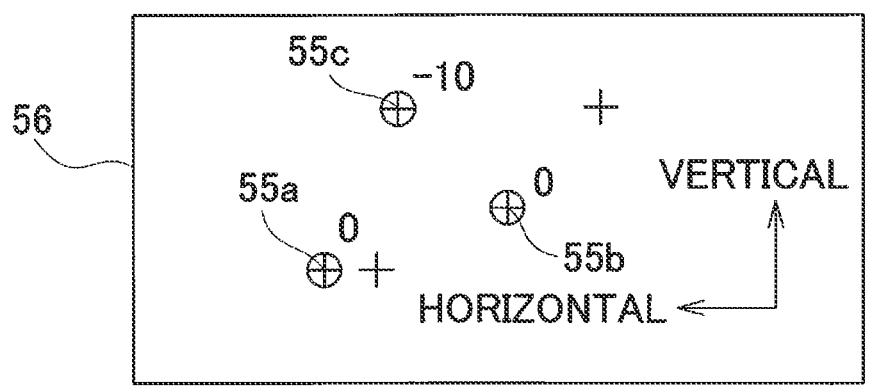
FIG. 8 is an explanatory drawing to explain a relationship between reference points set on the wall surface and the two-dimensional map.

Further, as shown in FIG. 7, a curved surface having irregularities may be used as a measuring plane 54. The measuring plane 54 has, for instance, three reference points 55a, 55b and 55c. Each of the reference points 55a, 55b and 55c has an offset value in a height direction (a depth direction) as well as two-dimensional plane coordinates. The offset value is an offset value in the height direction with respect to a two-dimensional map 56. Based on a measurement result of the reference points 55a, 55b 55c and the offset values with respect to the two-dimensional map 56, a tilt of the two-dimensional map 56 as shown in FIG. 8 is grasped.

Here, since each of the reference points 55a, 55b and 55c has the plane coordinates and the offset value in the height direction (the normal direction) with respect to the two-dimensional map 56. Therefore, by displaying the offset value in the normal direction with respect to the two-dimensional map 56, the display unit 28 enables showing each of the reference points 55a, 55b and 55c in the two-dimensional map 56.

Further, when the two-dimensional map 56 is created, a surface shape of the measuring plane 54 is grasped. The guiding processing after grasping the surface shape of the measuring plane 54 is the same as that in the case where the measuring plane is a flat surface, and hence a description thereof will be omitted.

Therefore, in the first embodiment, the guiding processing to the measuring point 43 is enabled irrespective of a position, a tilt or a shape of the measuring plane. Further, even if a position of the measuring plane changes to, for instance, a floor surface, a wall surface or a ceiling surface, an installing position of the surveying instrument 1 does not have to be changed.

Figure 9:
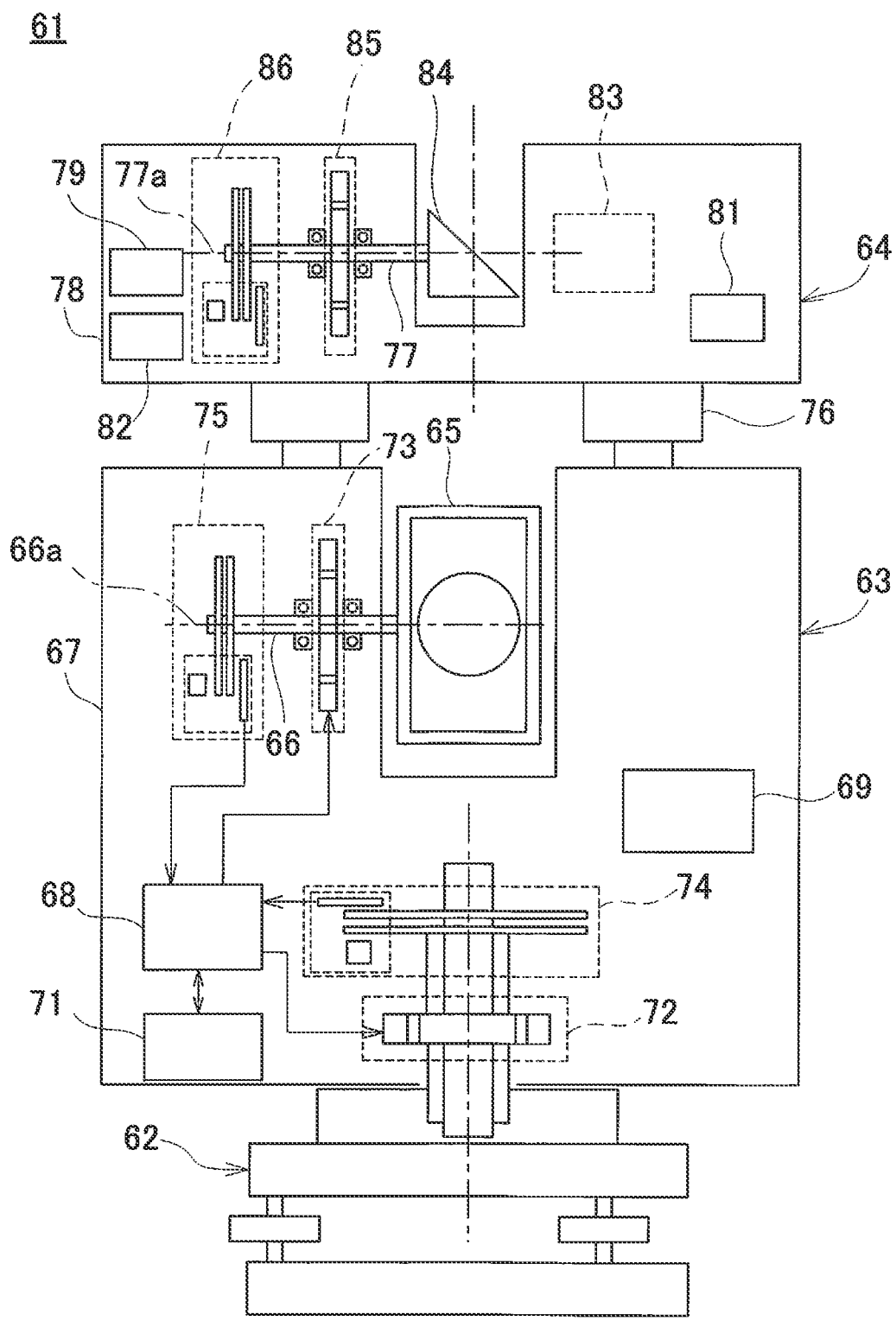
FIG. 9 is a front view to show a surveying instrument according to a second embodiment of the present invention.

Next, by referring to FIG. 9, a description will be given on a second embodiment of the present invention. It is to be noted that, in FIG. 9, the same components as shown in FIG. 2 are referred by the same symbols, and a description thereof will be omitted.

A surveying instrument 61 in the second embodiment has a leveling module 62 provided on a tripod 2 (see FIG. 3), a total station 63 as a first surveying instrument provided on the leveling module 62, and a uniaxial two-dimensional laser scanner 64 as a second surveying instrument provided on the total station 63. It is to be noted that, as the surveying instrument 61 having the two-dimensional laser scanner 64 provided on the total station 63, an instrument disclosed in, for instance, Japanese Patent Application Publication No. 2019-100898 can be used.

The total station 63 has a first measurement reference point. For instance, a point at which an optical axis (a first distance measuring optical axis) of a telescope module 65 having a distance measuring module incorporated crosses an axis 66a of a vertical rotation axis 66 is determined as a first measurement reference point.

Further, the total station 63 has a frame unit 67, and an arithmetic control module 68, a communication module 69, a storage module 71, a left-and-right rotation driving module 72 which rotates the frame unit 67 in the left-and-right direction, an up-and-down rotation driving module 73 which rotates the telescope module 65 in the up-and-down direction, a horizontal angle detector 74 which detects a horizontal angle of the frame unit 67, a vertical angle detector 75 which detects a vertical angle of the telescope module 65 and others are incorporated in the frame unit 67. It is to be noted that the left-and-right rotation driving module 72 and the up-and-down rotation driving module 73 constitute a first rotation driving module. Further, the telescope module 65 and the frame unit 67 constitute a first surveying instrument main body.

The arithmetic control module 68 is configured to control a distance measurement operation by the distance measuring module, the horizontal driving by the left-and-right rotation driving module 72, the vertical driving by the up-and-down rotation driving module 73 and the like, and to calculate three-dimensional coordinates of a measuring point based on a distance measurement result of the distance measuring module and detection results of the horizontal angle detector 74 and the vertical angle detector 75.

The two-dimensional laser scanner 64 is screwed to an upper surface of the total station 63 via a predetermined mounting member 76. Further, the two-dimensional laser scanner 64 has a second measurement reference point. For instance, a point at which a distance measuring optical axis (a second distance measuring optical axis) of the two-dimensional laser scanner 64 crosses an axis 77a of a vertical rotation shaft 77 is determined as the second measurement reference point. It is to be noted that the second reference point is placed on a vertical line passing through a first reference point, and an offset amount of the second measurement reference point with respect to the first measurement reference point is known.

Further, the two-dimensional laser scanner 64 has a frame unit 78 having a recess portion formed in a central part, and an arithmetic control module 79, a communication module 81, a storage module 82, a distance measuring module 83, an up-and-down rotation driving module 85 which rotates a scanning mirror 84 as an optical axis deflector accommodated in the recess portion in the up-and-down direction, a vertical angle detector 86 which detects a vertical angle of the scanning mirror 84 and others are incorporated in the frame unit 78. It is to be noted that the left-and-right rotation driving module 72 and the up-and-down rotation driving module 85 constitute a second rotation driving module. Further, the frame unit 78 and the scanning mirror 84 constitute a second surveying instrument main body. It is to be noted that the distance measuring module 83 also functions as a guiding light irradiation module which irradiates the distance measuring light 32, which is the visible light, as the guiding light.

The arithmetic control module 79 is configured to control a distance measurement operation by the distance measuring module 83, the vertical driving by the up-and-down rotation driving module 85 and the like, and to calculate two-dimensional coordinates of a measuring point based on a distance measurement result of the distance measuring module 83 and a detection result of the vertical angle detector 86.

It is to be noted that the arithmetic control modules 68 and 79 are provided to the total station 63 and the two-dimensional laser scanner 64, respectively, but the arithmetic control module 79 may be omitted, and the arithmetic control module 68 may be configured to control both the total station 63 and the two-dimensional laser scanner 64.

Further, in the storage module 71 or 82, programs equivalent to the programs in the storage module 21 in the first embodiment are stored.

In a state where the surveying instrument 61 has been leveled up by the leveling module 62, when the two-dimensional laser scanner 64 rotates the scanning mirror 84, a uniaxial scan by the distance measuring light is performed along a measuring plane in the vertical direction. That is, the uniaxial scan is performed in a vertical direction with respect to the horizontal two-dimensional map (a normal direction).

Next, a description will be given on a guiding operation using the surveying instrument 61 by referring to FIG. 10A to FIG. 10F. It is to be noted that, in FIG. 10A to FIG. 10F, a measuring plane 88 having a plurality of measuring points 87 is the ground or a floor surface, and the measuring plane 88 is a plane having a predetermined tilt.

Figure 10A:
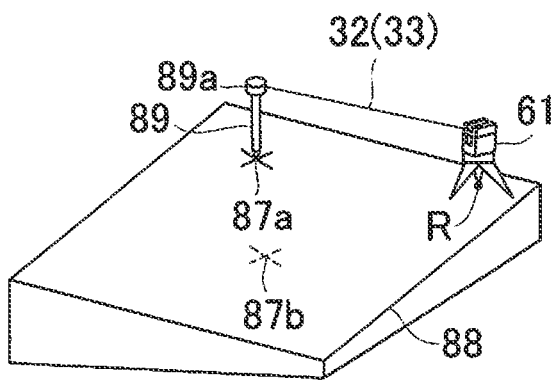
FIGS. 10A, 10B, 10C, 10D, 10E and 10F are explanatory drawings to explain the guiding processing of a target instrument according to the second embodiment.

As shown in FIG. 10A, the surveying instrument 61 is first installed on a reference point "R" having known three-dimensional coordinates, and the leveling is performed using the leveling module 62. A lower end of a target instrument 89 is arranged to coincide with a first measuring point 87a, and the leveling is performed in a vertical. In the second embodiment, the target instrument 89 has a prism 89a provided at a known position from the lower end and a level (not shown) for vertically leveling the target instrument 89.

In this state, the measurement is performed while tracking the target instrument 89 using the total station 63 of the surveying instrument 61, and three-dimensional coordinates of the first measuring point 87a are calculated with reference to a reference point "R". Alternatively, the target instrument 89 may be installed on the reference point "R", three-dimensional coordinates of the surveying instrument 61 may be calculated with reference to the reference point "R", and then the three-dimensional coordinates of the first measuring point 87a may be calculated.

When the measurement of the first measuring point 87a is finished and the marking with respect to the first measuring point 87a is completed, the surveying instrument 61 is allowed to start the guiding to a next measuring point (a second measuring point 87b) by a portable terminal (not shown) or the like. In the storage module 71, a two-dimensional map including the positional information of the respective measuring points 87 is stored in advance. The arithmetic control module 68 calculates a left-and-right rotation angle, or the left-and-right rotation angle and an up-and-down rotation angle from the first measuring point 87a to the second measuring point 87b with the reference point "R" as a center based on the positional information of the first measuring point 87a and the second measuring point 87b in the two-dimensional map.

Figure 10B:
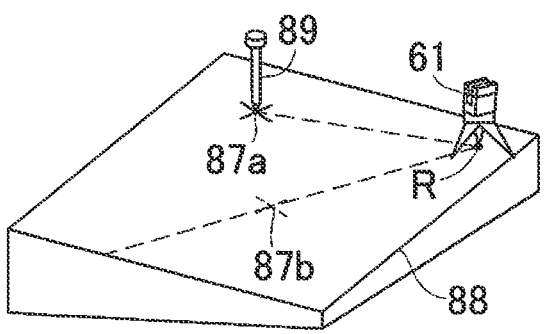
Figure 10C:
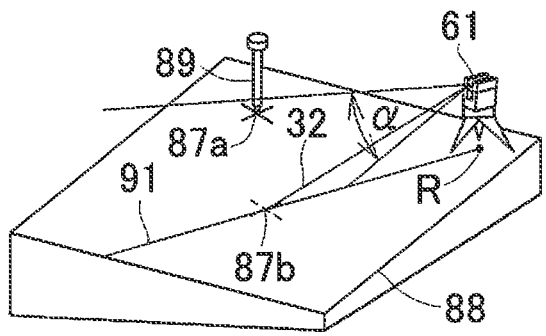

As shown in FIG. 10B, the arithmetic control module 68 drives the left-and-right rotation driving module 72 or the up-and-down rotation driving modules 73 and 85, and rotates the frame unit 67 based on the calculated left-and-right rotation angle, or the left-and-right rotation angle and the up-and-down rotation angle. After the rotation of the frame unit 67, as shown in FIG. 10C, the two-dimensional laser scanner 64 rotates the scanning mirror 84, and a uniaxial scan is performed along the measuring plane 88 in such a manner that a locus 91 of the distance measuring light 32 passes through the second measuring point 87b. In this time, a direction along which the scan is performed with the distance measuring light 32 is a normal direction of the two-dimensional map, that is, a vertical direction. Further, a rotation angle "α" (a scan range) of the scanning mirror 84 is appropriately set in correspondence with a position of the measuring plane 88, for instance, a floor surface or a ceiling surface. Thereby, a plane other than the measuring plane 88 can be prevented from being measured.

The point cloud data along the locus 91 is acquired by the uniaxial scan, and three-dimensional coordinates are calculated in accordance with each point. The arithmetic control module 68 compares plane (two-dimensional) coordinates excluding the height information from each point of the point cloud data with plane coordinates of the second measuring point 87b in the two-dimensional map, and determines whether a matching or most approximate point is present.

It is to be noted that there is a case where each point of the point cloud data is not present within a predetermined threshold value set in advance from the plane coordinates of the second measuring point 87b. In this case, a worker is informed by an alarm or the like, a point cloud acquisition interval is changed, and the uniaxial scan is again performed with the same locus.

When there is a matched point or a most approximate point with respect to the second measuring point 87b in the two-dimensional map, the arithmetic control module 68 selects this point as the provisional second measuring point 87b. Alternatively, the arithmetic control module 68 may select at least two points closest to the second measuring point 87b in the two-dimensional map from the respective points on the locus 91, and then a point closest to the second measuring point 87b in the two-dimensional map on a straight line connecting the two points may be calculated as the provisional second measuring point 87b by the arithmetic control module 68.

Figure 10D:
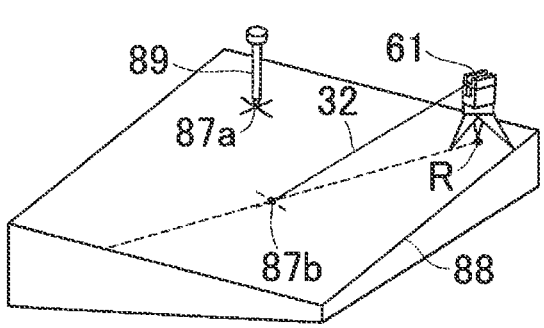

After selecting the provisional second measuring point 87b, as shown in FIG. 10D, the arithmetic control module 68 controls the up-and-down rotation driving module 85 in such a manner that the provisional second measuring point 87b is irradiated with the distance measuring light 32 which is the visible light. It is to be noted that the provisional second measuring point 87b may be irradiated with the distance measuring light from the total station 63 or the distance measuring light from the two-dimensional scanner 64.

Figure 10E:
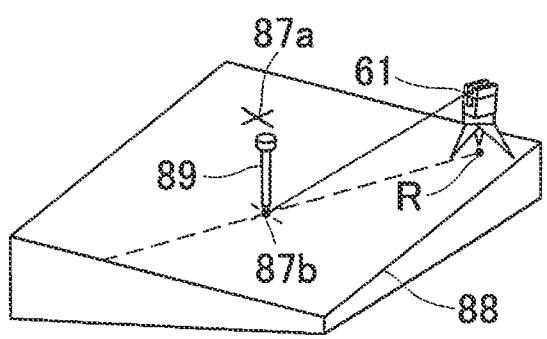

As shown in FIG. 10E, the worker moves the target instrument 89 with an irradiation point of the distance measuring light 32 as a mark, and roughly installs the target instrument 89 in such a manner that the lower end of the target instrument 89 coincides with the irradiation point of the distance measuring light 32 (the provisional second measuring point 87b) (the rough guiding).

Figure 10F:
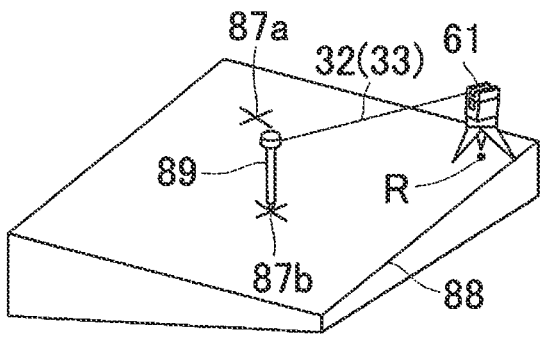

After the rough installation, as shown in FIG. 10F, the worker allows the surveying instrument 61 to start the tracking of the target instrument 89 via the portable terminal. The arithmetic control module 68 calculates a difference between the lower end of the target instrument 89 and the second measuring point 87b in real time based on a measurement result of the prism, and transmits a calculation result to the portable terminal via the communication module 69.

The worker installs the target instrument 89 based on the calculation result (the guiding information) displayed in the portable terminal in such a manner that the lower end of the target instrument 89 coincides with the second measuring point 87b (the accurate guiding).

At last, by marking the second measuring point 87b, the distance measuring instrument 61 completes the guiding processing from the first measuring point 87a to the second measuring point 87b. The processing is also performed with respect to the third and subsequent measuring points in the same manner as the guiding processing.

As described above, the second embodiment is configured so that a position of the next measuring point 87 is indicated by the distance measuring light 32 which is the visible light based on the two-dimensional map stored in advance in the storage module 71.

Therefore, since the worker can visually confirm the next measuring point 87 and easily move the target instrument 89 to the vicinity of the measuring point 87, the work efficiency can be improved.

Further, in the second embodiment, likewise, the uniaxial scan is performed along the measuring plane 88, and a rough position of the measuring point 87 (the provisional measuring point) is determined based on the acquired point cloud data. Therefore, since the 360° whole circumferential scan does not have to be performed, a point cloud data acquisition time can be shortened. Further, a data amount required for determining the rough position of the measuring point 87 is reduced, and a calculation time can be shortened.

Further, since the data amount for determining the rough position is reduced, it is possible to easily cope even in a case where a scanning direction has changed by, for instance, changing a position or a direction of the surveying instrument 61.

Further, the surveying instrument 61 tracks the target instrument 89 after performing the rough guiding of the target instrument 89. Therefore, since a tracking distance becomes short, the interruption of the tracking due to an obstacle or the like can be suppressed.

It is to be noted that, in the second embodiment, the surveying instrument 61 is leveled up and the uniaxial scan is performed in the vertical direction, but the surveying instrument 61 may be vertically installed with respect to the measuring plane 88, and the uniaxial scan may be performed in a direction vertical with respect to the two-dimensional map (the normal direction).

Further, in the second embodiment, the distance measuring light 32 is the visible light and the distance measuring module 83 is configured to also serve as a guiding light irradiation module, but the distance measuring module 83 and the guiding light irradiation module may be independently provided, respectively. For instance, the guiding light irradiation module which irradiates the laser pointer light coaxially with the distance measuring light 32 may be additionally provided in the two-dimensional laser scanner 64. In this case, at a rough guiding step and a accurate guiding step, the laser pointer light can be irradiated, and the target instrument 89 can be guided by the laser pointer light.

Further, the guiding light irradiation module may be externally provided to, for instance, the telescope module 65. In this case, the guiding light irradiation module is provided to the telescope module 65 so that an offset amount of an optical axis of the laser pointer light with respect to the distance measuring optical axis 31 is known. Further, at the rough guiding step and the accurate guiding step, when the guiding light irradiation module is rotated integrally with the telescope module 65 by the cooperation between the left-and-right rotation driving module 72 and the up-and-down rotation driving module 73, the target instrument 89 can be guided by the laser pointer beam. It is to be noted that, in a case where the distance measuring module 83 and the guiding light irradiation module are provided independently, the distance measuring light can be the invisible light.

Figure 11:
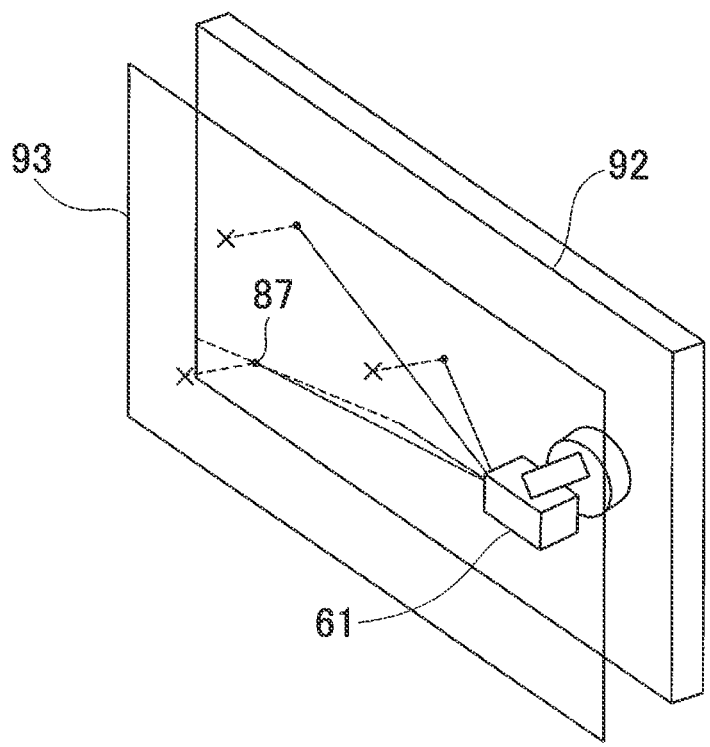
FIG. 11 is an explanatory drawing to explain a case where a measuring plane is a wall surface in the second embodiment.

Further, in the second embodiment, the ground or a floor surface is used as the measuring plane, and the guiding processing is performed, but the measuring plane may be, for instance, a wall surface or a ceiling surface. FIG. 11 shows the guiding processing in a case where a flat wall surface is the measuring plane 92.

In a case where the wall surface is the measuring plane 92, likewise, the surveying instrument 61 is installed on the measuring plane 92 in such a manner that the surveying instrument 61 becomes vertical with respect to the measuring plane 92. Regarding to the subsequent processing, the guiding processing is performed by the same processing as that in the case where the ground or the floor surface is the measuring plane. That is, the frame unit 67 is rotated based on a left-and-right rotation angle, or the left-and-right rotation angle and an up-and-down rotation angle to a next measuring point 87 calculated from a two-dimensional map 93, and a uniaxial scan is performed along the measuring plane 92 so that a locus 91 of the distance measuring light 32 passes through the next measuring point 87. In this time, a scan direction is, for instance, a direction vertical with respect to the two-dimensional map 93 (a normal direction), Further, the arithmetic control module 68 selects a point closest to the next measuring point 87 in the two-dimensional map 93 as a provisional measuring point, and the rough guiding is performed based on the distance measuring light 32 with which the provisional measuring point is irradiated.

Figure 12:
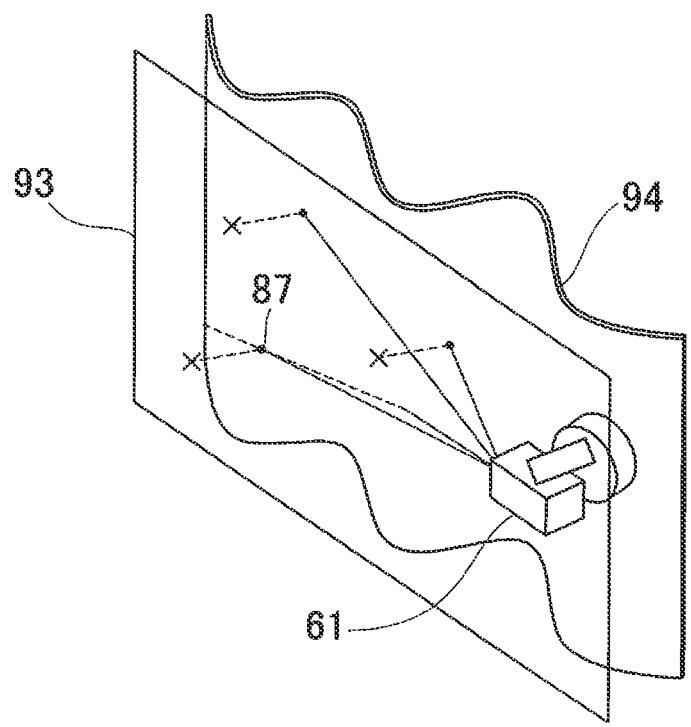
FIG. 12 is an explanatory drawing to explain a case where a measuring plane is a wall surface having irregularities in the second embodiment.

Further, as shown in FIG. 12, a curved surface having irregularities may be used as a measuring plane 94. Likewise, the measurement of the measuring plane 94 is the same as the case of measuring the measuring plane 88. That is, the surveying instrument 61 is installed in such a manner that the surveying instrument becomes vertical with respect to an installing position of the measuring plane 94, the frame unit 67 is rotated based on a left-and-right rotation angle, or the left-and-right rotation angle and an up-and-down rotation angle to the next measuring point 87 calculated from the two-dimensional map 89, a uniaxial scan is performed in a direction vertical with respect to the two-dimensional map 93 (the normal direction), a point closest to the next measuring point 87 in the two-dimensional map 93 is selected as the provisional measuring point, and the rough guiding is performed based on the distance measuring light 32 with which the provisional measuring point is irradiated.

Therefore, in the second embodiment, likewise, the guiding of the measuring point 87 is enabled irrespective of a position, a tilt, or a shape of the measuring plane.

The invention claimed is:

1. A surveying instrument comprising: a surveying instrument main body, wherein said surveying instrument main body includes a distance measuring module configured to project the distance measuring light toward an object and to perform the distance measurement based on the reflected distance measuring light from said object, an optical axis deflector configured to at least uniaxially perform a scan using said distance measuring light, a storage module configured to store a two-dimensional map having the positional information of a plurality of measuring points, and an arithmetic control module configured to control operations of said distance measuring module and said optical axis deflector, and said arithmetic control module is configured to compare two-dimensional coordinates excluding a height in three-dimensional coordinates of each point acquired along a locus of said distance measuring light with said positional information of said measuring point in said two-dimensional map, and select a point which is in a range of a threshold value set in advance from said positional information of said measuring point in said two-dimensional map as said measuring point.

2. The surveying instrument according to claim 1, wherein said arithmetic control module is configured to calculate a rotation angle from a predetermined measuring point to a next measuring point based on said two-dimensional map, and rotate said surveying instrument main body based on said rotation angle.

3. The surveying instrument according to claim 2, further includes a guiding light irradiation module configured to irradiate the guiding light, wherein said arithmetic control module is configured to indicate said selected measuring point with said guiding light.

4. The surveying instrument according to claim 3, wherein said guiding light irradiation module is said distance measuring module, and said guiding light is said distance measuring light which is the visible light.

5. The surveying instrument according to claim 3, wherein said guiding light irradiation module is configured to irradiate the laser pointer light coaxially with said distance measuring light.

6. The surveying instrument according to claim 3, wherein said guiding light irradiation module is configured to irradiate said laser pointer light with a known offset amount with respect to an optical axis of said distance measuring light, and to rotate integrally with said surveying instrument main body by a rotation driving module which rotates said surveying instrument main body in a left-and-right direction or an up-and-down direction.

7. The surveying instrument according to claim 3, wherein said arithmetic control module is configured to select two points closest from said measuring point in said two-dimensional map among respective points acquired along said locus of said distance measuring light and to calculate a point closest from said measuring point in said two-dimensional map on a line connecting said selected two points as said measuring point.

8. The surveying instrument according to claim 1, further includes a guiding light irradiation module configured to irradiate the guiding light, wherein said arithmetic control module is configured to indicate said selected measuring point with said guiding light.

9. The surveying instrument according to claim 8, wherein said guiding light irradiation module is said distance measuring module, and said guiding light is said distance measuring light which is the visible light.

10. The surveying instrument according to claim 9, wherein said optical axis deflector is a pair of optical prisms rotatable around said optical axis of said distance measuring light and is configured to control an irradiating direction of said distance measuring light by controlling rotating directions, rotation speeds and a rotation ratio of said pair of optical prisms, and said arithmetic control module is configured to control said optical axis deflector in such a manner that said distance measuring light draws a circle with a predetermined radius around said selected measuring point.

11. The surveying instrument according to claim 9, further includes a rotation driving module configured to rotate said surveying instrument main body in a left-and-right direction or an up-and-down direction, wherein said optical axis deflector is a scanning mirror which is uniaxially rotatable around an optical axis of said distance measuring light, and said arithmetic control module is configured to control said rotation driving module and said scanning mirror in such a manner that said selected measuring point is irradiated with said distance measuring light.

12. The surveying instrument according to claim 8, wherein said guiding light irradiation module is configured to irradiate the laser pointer light coaxially with said distance measuring light.

13. The surveying instrument according to claim 8, wherein said guiding light irradiation module is configured to irradiate said laser pointer light with a known offset amount with respect to an optical axis of said distance measuring light, and to rotate integrally with said surveying instrument main body by a rotation driving module which rotates said surveying instrument main body in a left-and-right direction or an up-and-down direction.

14. The surveying instrument according to claim 8, wherein said optical axis deflector is a pair of optical prisms rotatable around said optical axis of said distance measuring light and is configured to control an irradiating direction of said distance measuring light by controlling rotating directions, rotation speeds and a rotation ratio of said pair of optical prisms, and said arithmetic control module is configured to control said optical axis deflector in such a manner that said distance measuring light draws a circle with a predetermined radius around said selected measuring point.

15. The surveying instrument according to claim 8, further includes a rotation driving module configured to rotate said surveying instrument main body in a left-and-right direction or an up-and-down direction, wherein said optical axis deflector is a scanning mirror which is uniaxially rotatable around an optical axis of said distance measuring light, and said arithmetic control module is configured to control said rotation driving module and said scanning mirror in such a manner that said selected measuring point is irradiated with said distance measuring light.

16. The surveying instrument according to claim 1, wherein said arithmetic control module is configured to select two points closest from said measuring point in said two-dimensional map among respective points acquired along said locus of said distance measuring light and to calculate a point closest from said measuring point in said two-dimensional map on a line connecting said selected two points as said measuring point.

17. The surveying instrument according to claim 1, wherein said arithmetic control module is configured to give notice with the use of an alarm in a case where respective points acquired along said locus of said distance measuring light are not present in said range of said threshold value.

18. The surveying instrument according to claim 1, wherein said arithmetic control module is configured to control said optical axis deflector in such a manner that a scan using said distance measuring light is performed in a direction vertical with respect to a plane of said two-dimensional map.

19. A surveying system comprising: a target instrument installed on a predetermined measuring point and a surveying instrument configured to track said target instrument, wherein said surveying instrument includes a distance measuring module configured to project the distance measuring light toward said target instrument and to perform the distance measurement based on the reflected distance measuring light from said target instrument, an optical axis deflector configured to at least uniaxially perform a scan using said distance measuring light, a storage module configured to store a two-dimensional map having the positional information of a plurality of measuring points, and an arithmetic control module configured to control operations of said distance measuring module and said optical axis deflector, and said arithmetic control module is configured to calculate a rotation angle to a next measuring point based on a measurement result of said target instrument and said positional information of said measuring point in said two-dimensional map, to rotate said surveying instrument based on said rotation angle, uniaxially perform a scan along a measuring plane in such a manner that said distance measuring light passes through said next measuring point, to compare two-dimensional coordinates excluding a height in three-dimensional coordinates of each point acquired along a locus of said distance measuring light with said positional information of said measuring point in said two-dimensional map, and to select a point which is in a range of a threshold value set in advance from said positional information of said measuring point in said two-dimensional map as said measuring point.

20. The surveying system according to claim 19, wherein said surveying instrument further includes a guiding light irradiation module configured to irradiate the guiding light, and said arithmetic control module is configured to indicate said selected measuring point with said guiding light and move said target instrument in such a manner that said indicated measuring point coincides with a lower end of said target instrument.

* * * * *